Figure 1:
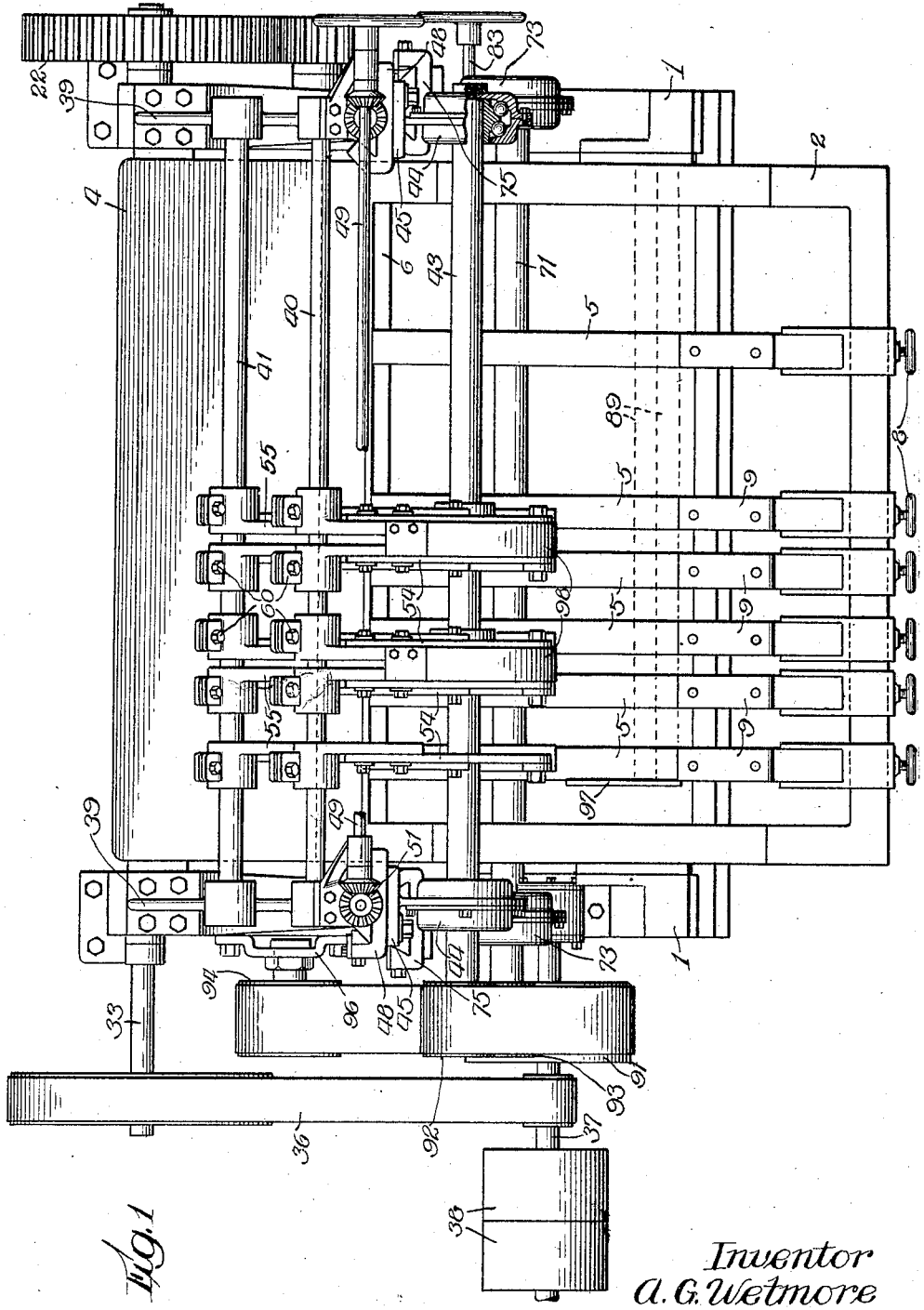

Dec. 16, 1924.

A. G. WETMORE 1,519,647

MACHINE FOR CUTTING MATERIALS

Filed Nov. 19, 1920        8 Sheets-Sheet 1

Inventor
A. G. Wetmore
By Arthur H. Durand
Atty.

Dec. 16, 1924.
A. G. WETMORE
1,519,647
MACHINE FOR CUTTING MATERIALS
Filed Nov. 19, 1920     8 Sheets-Sheet 2
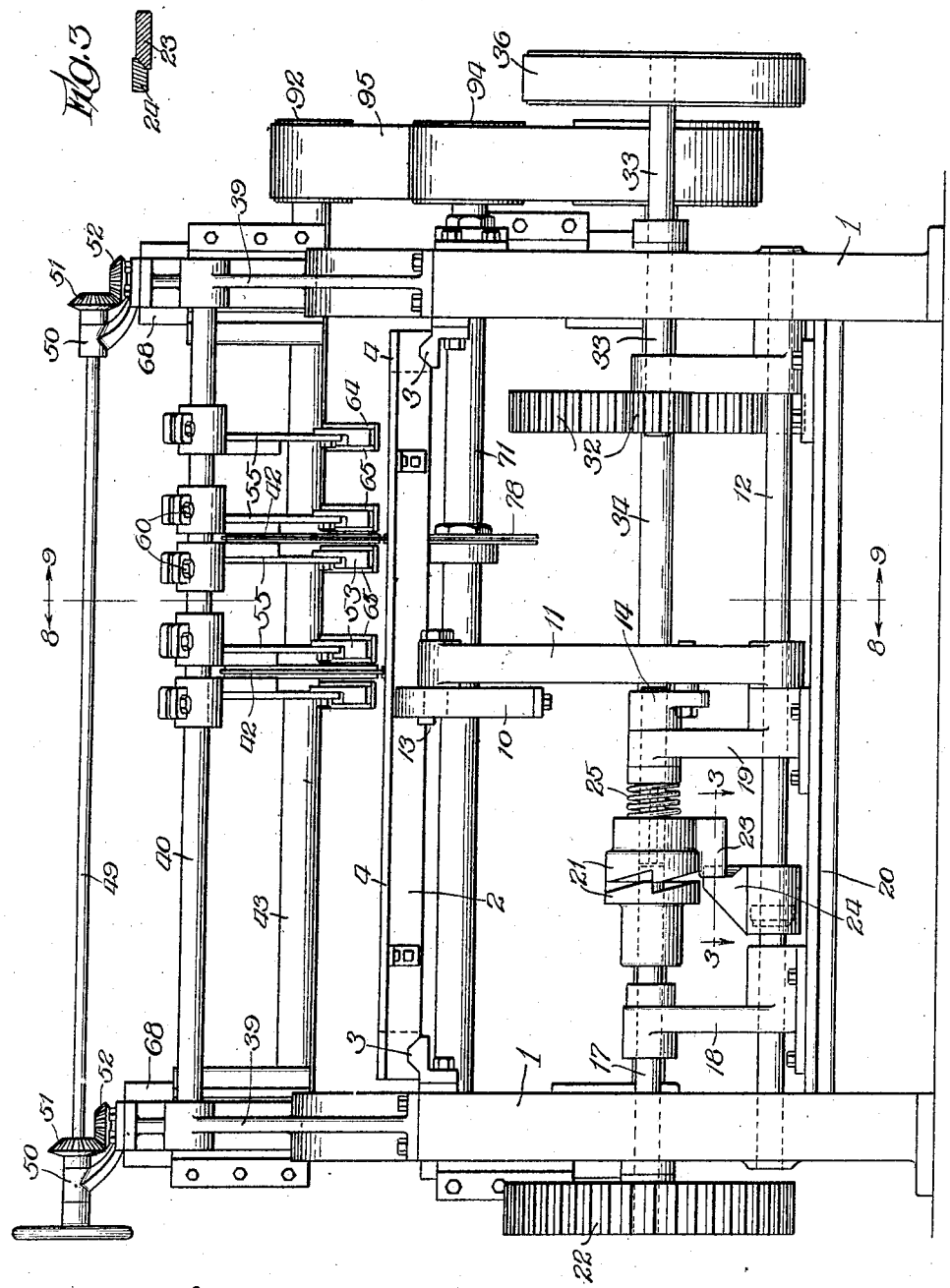
Inventor
A. G. Wetmore
By Arthur F. Durand
Atty.

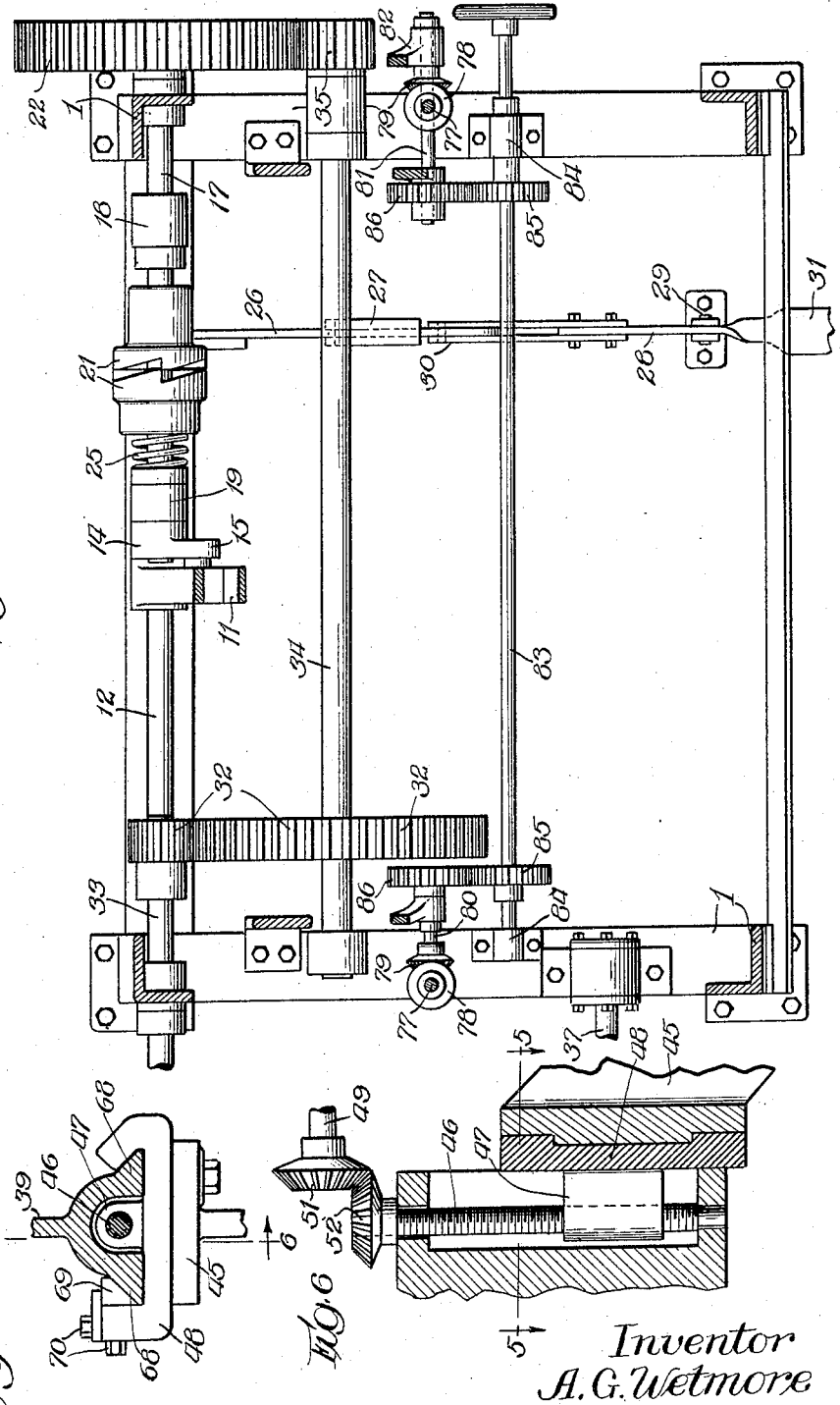

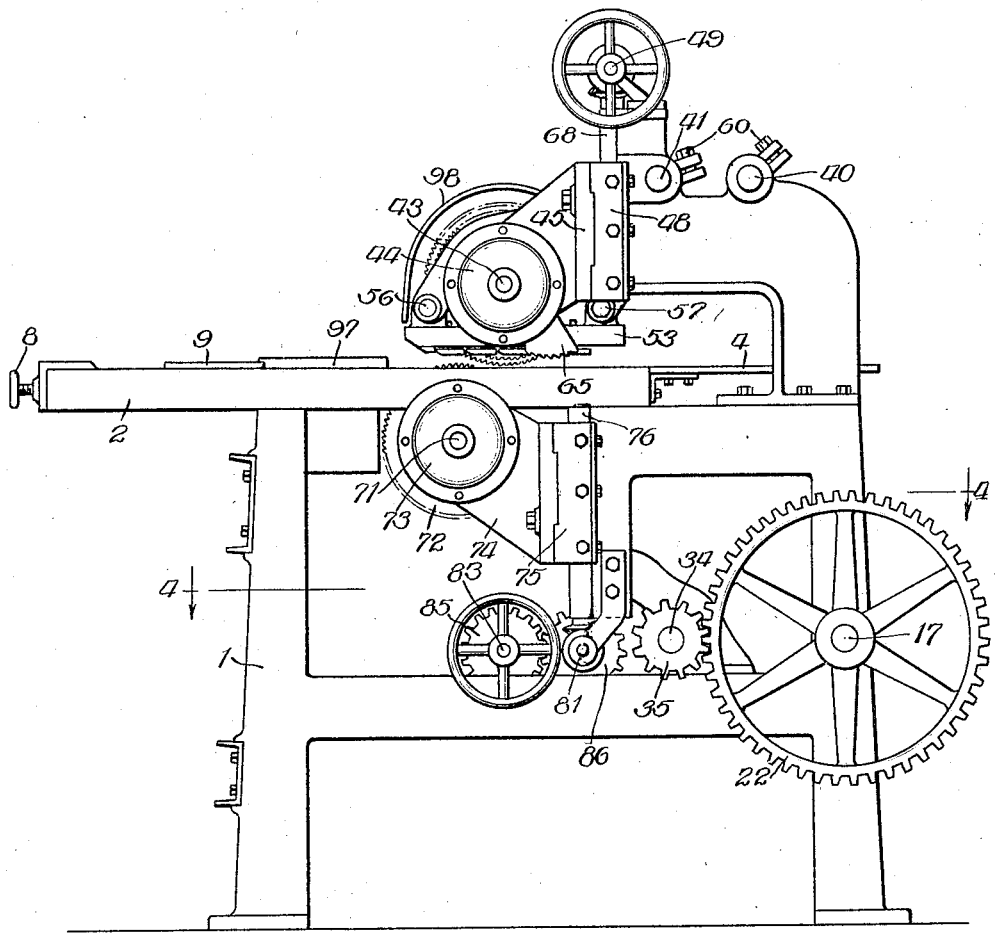

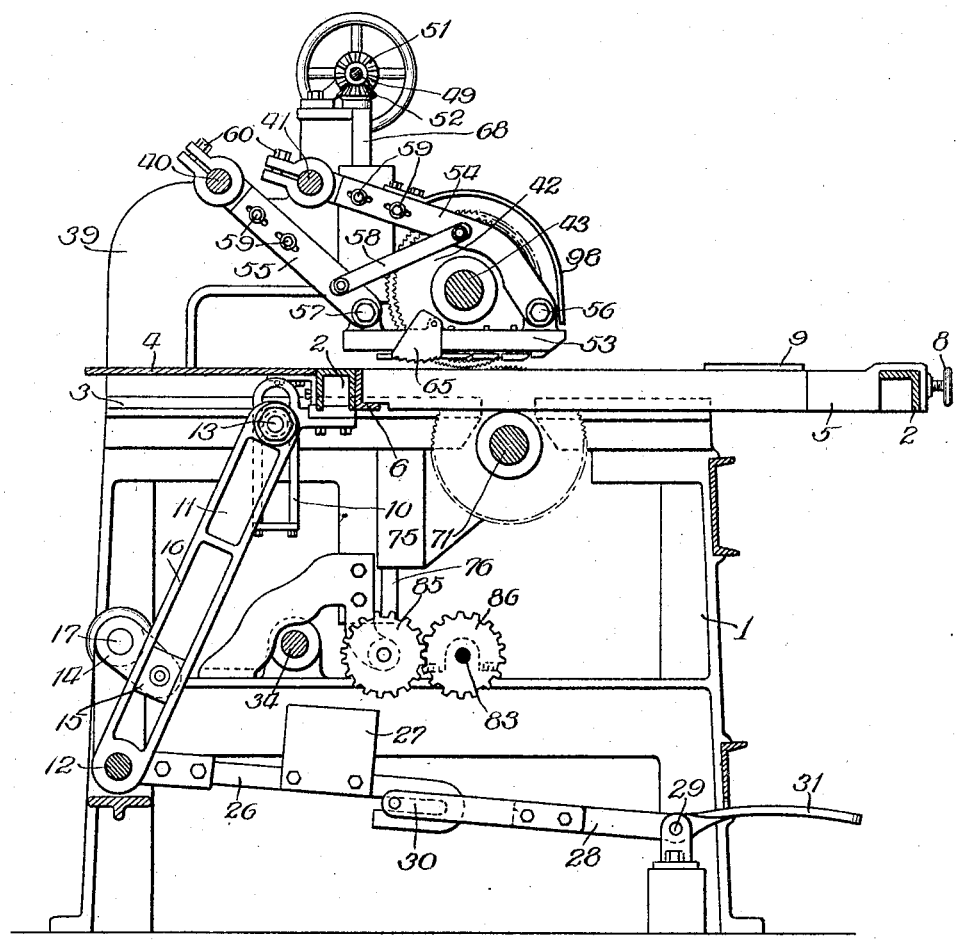

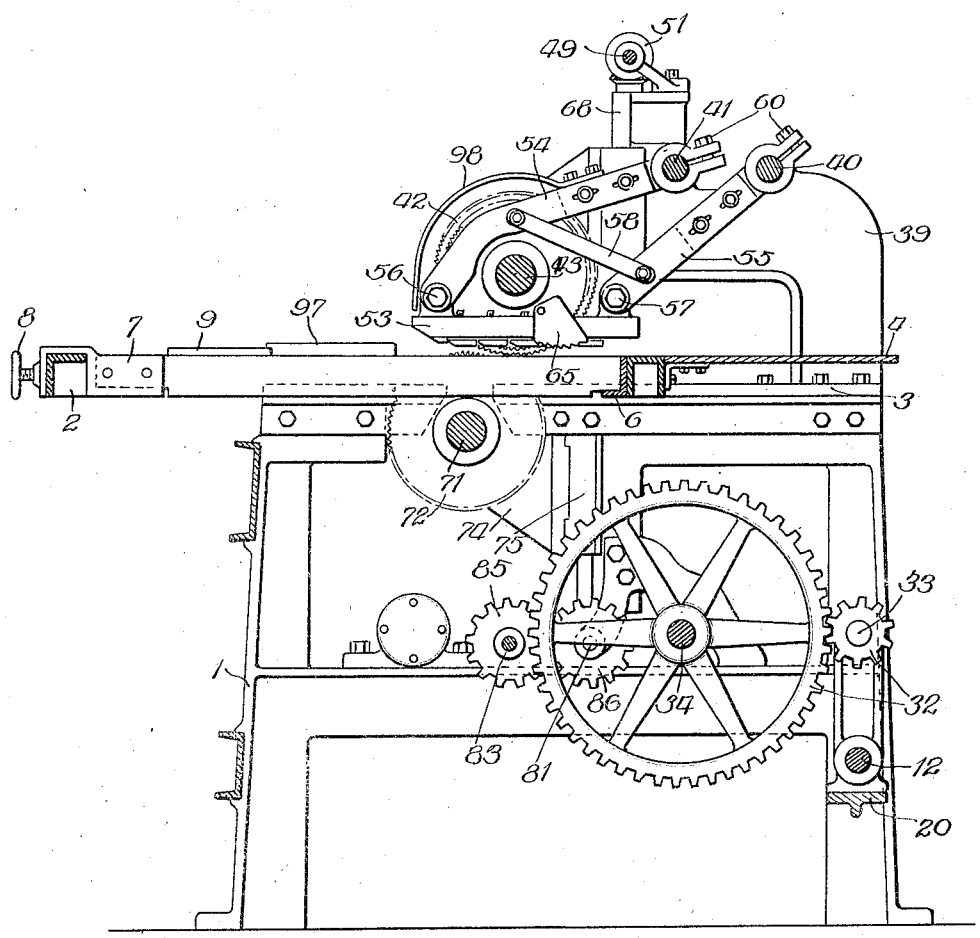

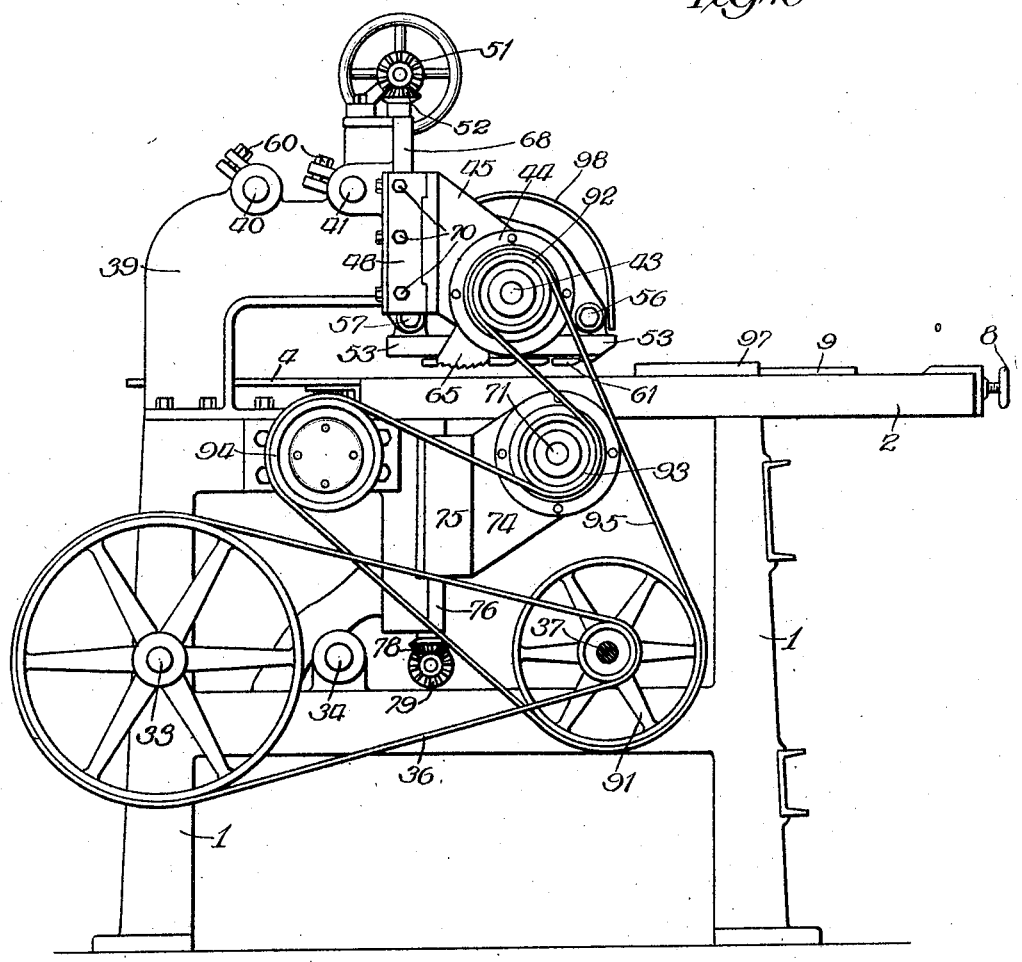

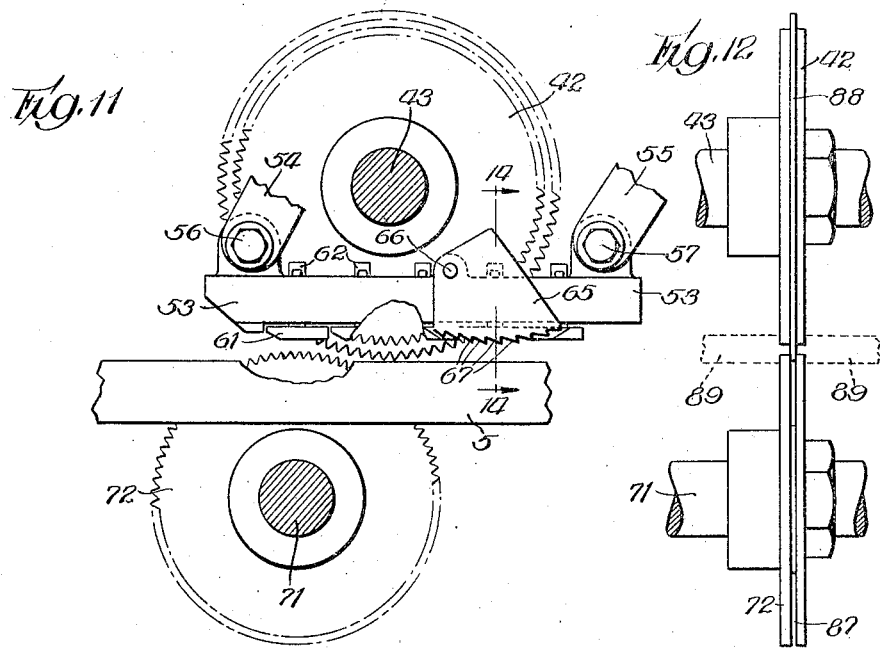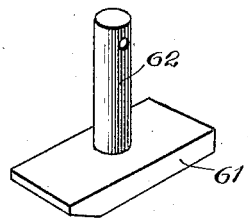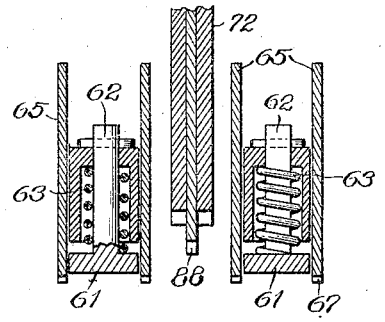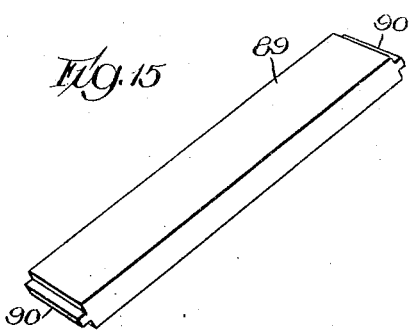

Patented Dec. 16, 1924.

1,519,647

UNITED STATES PATENT OFFICE.

ALBERT G. WETMORE, OF PLYMOUTH, INDIANA.

MACHINE FOR CUTTING MATERIALS.

Application filed November 19, 1920. Serial No. 425,230.

*To all whom it may concern:*

Be it known that I, ALBERT G. WETMORE, of Plymouth, Marshall County, Indiana, have invented a certain new and useful Improvement in Machines for Cutting Materials, of which the following is a specification.

This invention relates to machines for cutting the ends of the cleats of wire bound boxes, or for other purposes.

Generally stated, the object of the invention is to provide a novel and improved construction whereby long strips are conveniently and effectively divided into relatively short lengths or sections, with the opposite ends of each length or section of the desired formation, thereby to produce the cleats necessary for wire bound boxes, or for other purposes.

It is also an object to provide certain details and features of construction and combinations tending to increase the general efficiency and the desirability of a machine of this particular character.

To the foregoing and other useful ends the invention consists of matters hereinafter set forth and claimed and shown in the accompanying drawings in which Figure 1 is a plan of a cleat cutting or tenoning machine embodying the principles of the invention; Figure 2 is a rear elevation of said machine; Figure 3 is a detail section on line 3—3 in Figure 2; Figure 4 is a horizontal section on line 4—4 in Figure 7; Figure 5 is an enlarged detail section on line 5—5 in Figure 6; Figure 6 is a section on line 6—6 in Figure 5; Figure 7 is a side elevation of said machine, showing one side thereof; Figure 8 is a vertical section on line 8—8 in Figure 2; Figure 9 is a vertical section on line 9—9 in Figure 2; Figure 10 is a side elevation of said machine, showing the other side thereof; Figure 11 is an enlarged detail fragmentary view showing certain portions of the machine; Figure 12 is an edge view of the saws shown in Figure 11; Figure 13 is a perspective of one of the devices employed for holding the long strips down in place as they pass between the upper and lower saws; Figure 14 is an enlarged detail section on line 14—14 in Figure 11; Figure 15 is a perspective of one of the cleats made by the machine.

As thus illustrated, the invention comprises a main body frame 1 adapted to support the various operative parts in suitably elevated positions, and to provide bearings for shafts and other rotary elements. A rectangular frame 2 slides horizontally in guides 3 on the body frame, this frame being provided with a shelf 4 at the rear of the machine. Supporting bars 5 have their forward ends adapted to rest on the ledge 6 of the said horizontal sliding frame 2, and have their rear ends provided with brackets 7 which rest upon the rear portion of said frame, and which are provided with set screws 8 for clamping the bars in position. With this arrangement the bars 5 are adjustable laterally to support the long strips of wood in the desired manner, each bar 5 being provided with a block 9 which provides a shoulder for engaging the long strips of wood, the latter extending transversely of the machine when they are arranged, several of them tightly together, as shown in the drawings.

The front portion of frame 2 is provided with a vertically arranged guide 10 of any suitable character, and a lever 11 is pivoted at its end on the shaft 12 and provided at its upper end with a suitable engaging portion 13 which slides up and down in the guide 10, when the table formed by the frame 2 reciprocates in a horizontal plane. To produce said reciprocation of the table, the lever 11 is operated by a rotary crank arm 14 provided at its end with a block 15 which slides up and down in the guide 16 formed in said lever. Said crank arm 14 is carried by the shaft 17, which latter is supported in bracket bearings 18 and 19 suitably mounted on the horizontal member 20 of the main body frame. The said shaft 17 is divided into two sections and the two sections are connected by a clutch device 21 of any suitable character, whereby power transmitted to one section of the shaft from the gear wheel 22 rigid therewith serves to communicate power through said clutch device to the other section of the shaft with which the crank arm 14 is rigid, so that the lever 11 is thereby actuated to reciprocate the table horizontally. The clutch device rotates, of course, and is provided with a cam portion 23 for engaging the cam portion 24 carried by the shaft 12 previously mentioned. As will hereinafter more fully appear, engagement of said portions 23 and 24 serves to open the clutch, as shown in Figure 2, thus automatically stopping the rotation of the crank arm 14, and bringing the reciprocating table to a standstill in the position shown in the drawings, whereby the table can be again loaded with fresh materials preparatory to its next movement forward. The spring 25, it will be understood, serves to automatically close the clutch when the shaft 12 is again rocked in a direction to disengage the cam 24 from the cam 23, the arm 26 provided with a weight 27 being rigid with said rocked shaft for this purpose.

To rock the shaft 12 in the other direction when it is desired to place the cam 24 in operative position, a foot lever 28 is provided and pivoted on the body frame at 29, and provided with a loose connection 30 with the lever 26, whereby downward pressure on the foot pedal 31 will rock the shaft 12 in a direction to bring the cam portion 24 into position to be engaged by the cam portion 23, which latter rotates with that section of the shaft 17 upon which the crank arm 14 is mounted.

Power is communicated to the gear wheel 22 by means of a gear connection 32 from the short shaft 33 to the long shaft 34, and from the latter to the pinion 35 which engages the gear wheel 22, said shaft 33 being connected by a belt pulley 36 with a drive shaft 37, which latter is supported in any suitable manner and provided with fast and loose pulleys 38 for the belt (not shown) which communicates power to the machine.

The top of the body frame is provided with oppositely arranged brackets 39, one at each side of the machine, and rock shafts or cylindric supports 40 and 41 are suitably mounted in bearings on said brackets, so that they extend transversely of the machine, and, preferably, in the same horizontal plane. The upper saws 42 are carried and operated by a transverse shaft 43 which is supported by ball bearings 44, of any suitable character, supported by brackets 45 which are movable up and down on the brackets 39, the latter being provided with vertical screws 46 for this purpose. Said screws engage threaded portions 47 which are rigid with the blocks 48, the brackets 45 being laterally adjustable on the blocks 48, in any suitable or desired manner, if such is necessary or desirable. It will be seen, therefore, that the rotation of the screws 46 will serve to raise and lower the brackets 45 and to thus raise and lower the upper saws or cutters 42 previously mentioned. For the purpose of rotating said screws 46, any suitable or desired means can be employed.

As shown, a transverse handwheel shaft 49 is mounted in bearings 50 secured to the tops of brackets 39 and provided with bevel gears 51 for engaging the similar bevels 52 secured to the upper ends of the screws 46, whereby rotation of said shaft 49 will operate the screws and thereby raise and lower the upper saws, thus insuring practically a micrometer adjustment for said saws. It will be understood that there are as many saws or cutters 42 as necessary, depending upon how many lengths or sections the long strips of wood are to be divided into by their passage through the machine; that is to say, depending upon the length desired for the finished cleats which form the product of the machine. For each saw there is a horizontally disposed shoe 53 which is supported by arms 54 and 55 mounted, respectively, upon the transverse shafts or cylindric supports 41 and 40 previously mentioned, said arms being pivoted at 56 and 57 on the front and rear ends of said shoe, being connected by brace 58 suitably secured in place thereon. In addition, the arms 54 and 55 have adjustable connections 59 which permit them to be lengthened and shortened to obtain proper adjustment of the shoe. The upper ends of the arms 54 and 55 have split collars provided with clamping bolts or screws 60 by which the arms are clamped on the shafts or cylindric supports 40 and 41 in the manner shown.

To bear upon the top surface of the wood strips, engaging portions 61 are provided, each portion having an upstanding stem 62 which slides up and down in the top wall of the shoe 53, bearings 63 being provided to keep the portions 61 yieldingly applied to the top surface of the work as the wood strips slide forward below the saws or cutters. In practice, as shown, there is a shoe 53 at each side of each cutter. Also, one or more single shoes 64 can be employed at the side of machine, or at both sides, without being allotted to any saw or cutter, if this is necessary or desirable. Pivoted swinging members in the form of plates 65 are pivoted at 66 on the sides of each shoe 53, each plate having its lower edge provided with teeth 67 to drag on the forwardly moving strips of wood, whereby the work is prevented from following the table back to its normal position, as the said teeth will dig into the cleats and thus shove them forward, so to speak, upon the table or shelf 4 previously mentioned, thus leaving the front portion of the reciprocating table entirely clear and in condition to receive the fresh strips of wood for the next operation of the machine.

Each shoe 53 is provided with several of the engaging portions 61, as shown in Figure 11, and the materials are thus held down upon the reciprocating table while passing under the saws or cutters. The saws and means thus provided for bearing down upon the work are adjustable up and down bodily, the saws being adjusted by the screws previously described, and the shoes 53 being movable up and down by adjustment of the arms 54 and 55 on their supports in the manner previously explained. Preferably, the brackets 39 are formed with vertical guides 68, and the blocks 48 are adapted to engage these guides, being provided with removable strips 69 at one side, for engaging one of said guides, so that by loosening the bolts 70 the blocks 48 can be removed, it being necessary, of course, for this purpose, to detach the screw threaded blocks 47 from the screws 46 in any suitable or desired manner.

The transverse shaft 71 is provided with cutters 72 and is supported in ball bearings 73 carried by the brackets 74, which latter are mounted on blocks 75 similar to the blocks 48 previously described, said blocks 75 being adjustable up and down on the guides 76 provided on the body frame of the machine. For the adjustment of the brackets 74 up and down, vertical screws 77 are provided, similar to the screws 46 previously described, and these screws are provided with bevel gears 78 which engage the similar bevels 79 on the short shafts 80 and 81, these short shafts being supported in bearings 82 mounted on the body frame.

The transversely arranged hand wheel shaft 83 is mounted in bearings 84 on the body frame and provided with gear wheels 85 which engage the gear wheels 86 on the said shafts 80 and 81, whereby rotation of the shaft 83 by its hand wheel will rotate the screws 77 and cause the shaft 71 to move up and down. Thus the lower cutters 72 are adjustable up and down, as well as the upper cutters, thereby to accurately adjust the machine to insure the desired results, depending upon varying conditions. As shown, said lower cutters 72 are formed by two flat discs having cutting teeth around their edges and spaced apart to provide a groove 87 between them. Upper cutters 42, it will be seen, are each formed of three flat discs clamped together, with teeth on the edge of each disc, and with the middle disc a little larger in diameter to provide a tongue 88 which is opposite the groove 87 of the opposite lower cutter. Thus, with this arrangement the cleats 89 are formed at each end with a tongue 90, as shown in Figure 15, the cutting tongue 88 of each upper cutter serving to entirely sever the long strip of wood from which the cleats are made, in the manner more clearly indicated in Figure 12, so that the cleats are cut apart and left with tongues at their opposite ends.

As shown in Figures 1 and 10, the shaft 37 previously mentioned, is provided with a pulley wheel 91, and the saw shafts 43 and 71 are provided with pulleys 92 and 93 of any suitable character. The idler pulley 94 is suitably mounted at the side of the machine, and a belt 95 is arranged to travel around the said pulleys 91, 92, 93, and 94, as shown in Figure 10, thereby to drive the upper and lower cutters in the desired manner, it being understood that the cutters revolve or rotate in a direction tending to keep the strips of wood pressed tightly together and rearwardly against the shoulders provided by the blocks 9 previously described. The idler 94 is adjustable on the bracket 96 by which it is supported on the body frame, if desired, thereby to tighten or loosen the belt 95, as circumstances may require.

The mode of operation is as follows: The long strips of wood from which the cleats are to be made are placed transversely, and close together, in a horizontal plane, against the shoulders provided by the forward ends of the blocks 9, and upon the bars 5 previously described, in position to pass under the upper cutters and over the lower cutters. At such time, the operator is pressing down on the pedal 31, and the clutch 21 is open, and the reciprocating table 2 and 4 is at rest in position shown in the drawings. The work having been properly arranged on the reciprocating table, the cutters being properly positioned to produce cleats of the desired lengths, the operator releases the pressure on the pedal 31, thereby tilting the rock shaft 12 in a direction to disengage the cam 24 from the cam 23, allowing the spring 25 to close the clutch 21, and the movement of the table is thus started in its forward direction to carry the work between the cutters. During the operation of the machine, for example, while the table is returning to the front of the machine, so that the finished cleats are being crowded on to the shelf 4, the operator presses on the pedal 31 to throw the cam 24 into operative position, and the machine stops as soon as this cam is engaged by the cam 23, the clutch being automatically opened by the co-operation of the two cams. This is timed at the moment that the table reaches the limit of its rearward movement, so that it stops in position shown in the drawings. After fresh strips are placed on the table, in proper position to slide under the engaging portions 61 previously described, the operator then releases the pedal 31, thereby closing the clutch 21, and again starting the forward motion of the reciprocating table.

The shoes 53 are movable up and down, according to the thickness of the materials, in the manner previously explained, and are always horizontal because of the manner in which they are supported by the two arms 54 and 55, thus insuring a practically even pressure of the engaging portions 61 uniformly on the upper surface of the materials. The saws or cutters, of course, operate continuously, and are always rotating, regardless of whether the reciprocating table is moving or standing still, so long as the shaft 37 continues to be driven. When the rotation of this shaft stops, then the entire machine stops; and, in this way, the operator can control the operation of the reciprocating table, in order to facilitate the convenient and easy arrangement of the materials on the table, without interrupting the rotation of the cutters. The cutters can be adjusted up and down during the operation of the machine, if circumstances require. The long strip of wood is severed or divided into a number of short lengths such as the one shown in Figure 15, thus forming the finished cleats. Of course, though, the shape or formation of the cutters can be of any suitable character, depending upon the shape desired for the ends of the cleats or short sections of wood; but, as shown, the machine is particularly adapted for making cleats of a certain kind which are employed in the manufacture of wire bound boxes.

A machine of this kind is capable of running at high speed. With practice the operator can place new materials on the table without stopping its operation, during the interval between its backward movement and its forward movement, but if it is desired to stop the table then pressure on the pedal 31 will bring about the desired result, and it will be observed that the table can only stop in its retracted or normal position at the front of the machine, which is the position shown in the drawings.

The cutters are laterally adjustable on their shafts, in any suitable manner, so that cleats of different lengths can be made. For the same purpose, the bars 5 are laterally adjustable as previously explained. Referring to Fig. 11, it will be seen that the upper cutter is a little in rear of the lower cutter, relatively to the front side of the machine, so that the lower cutter forms a groove in the long strips before the upper cutter engages the materials, thus ensuring a groove on the bottom into which the tongue 88 cuts in order to sever the materials and form the separate short sections which form the finished cleats. The cutters act successively on the materials, and as the lower edge of the upper cutter is a little lower than the upper edge of the lower cutter, it follows that the materials are completely severed after passing under the upper cutter. In this way the effect is the same as though the tongue 88 really entered the groove 87, but without any danger of contact between the two cutters. During this time the strips of wood are held down by the portions 61, and the latter, when no materials are under the shoes 53, are held by any suitable means against dropping down below a certain level. The plates 65 operate like ratchet dogs to prevent the materials from following the table back to normal position at the front of the machine. The cutters sever the materials along lines between the bars 5, and the outside bar at one side of the machine preferably has a stop or gauge 97 to engage the ends of the materials, so that they will be even or in line at their ends. It will also be seen that guards 98 are secured to the arms 54 to cover the upper cutters.

The arms 54 and 55 are adjustable laterally on the supports 40 and 41, of course, by loosening the screws 60, so that the shoes are adjustable laterally with the saws or cutters, when it is desired to change the length of the cleats. In this way, the entire machine is readily adjustable for the production of cleats of different lengths, from long strips laid side by side on the reciprocating table. The bars 5, of course, move endwise back and forth between the lower saws or cutters, when the table reciprocates in the horizontal plane thereof.

With the construction shown and described, involving the groove 87 disposed opposite the severing tongue 88, the double tenon formed is severed where the groove 87 leaves a ridge or a portion of the wood in the lower tenon. The formation of the web or fin of wood in the lower tenon, by the groove 87, does not interfere with the desired result, as it is no thicker than the tongue 88, and in this way the latter cuts through cleanly and the said web or fin, if it has not already been broken off by the friction of the lower cutter, is then released from the double tenon formation thus produced, the object being to do this cutting without leaving ragged edges and as smoothly and cleanly as possible.

What I claim as my invention is:—

1. In a tenoning machine for tenoning and severing materials by the same means, the combination of a rotary tenoning cutter having a peripheral tongue, a rotary tenoning cutter having a peripheral groove opposite said tongue, so that said tongue serves to sever the materials where the groove leaves a portion thereof, and instrumentalities to pass the materials between said cutters.

2. A structure as specified in claim 1, in combination with means at each side of said tongue cutter to bear upon the materials.

3. A structure as specified in claim 1, said cutter with the tongue being above the cutter with the groove, and means to adjust the cutters relatively to vary the position of the tongue relatively to the groove.

4. A structure as specified in claim 1, in combination with means to support the cutter with the tongue above and somewhat to the rear of the other cutter, so that the lower cutter engages the materials before they are engaged by the upper cutter, thereby to cut a groove on the bottom of the materials before the same are severed by the tongue of the upper cutter.

5. A structure as specified in claim 1, said cutter with the tongue being disposed above and somewhat to the rear of the cutter with the groove, so that the lower cutter forms a double groove on the under side of the materials before the same are engaged by the upper cutter.

6. A structure as specified in claim 1, the two cutters being arranged to act successively on the materials, in the same vertical plane, with the lower edge of one cutter a little lower than the upper edge of the other cutter.

7. In a tenoning machine, the combination of parallel longitudinal bars to support the materials, a reciprocating frame to support said bars, means whereby said bars are laterally adjustable independently of each other, horizontally on said frame, means on one bar to engage the ends of the materials, and cutting means to sever the materials along lines between the bars.

8. A structure as specified in claim 7, and transverse means on each bar to engage the rear edge of the materials.

9. A structure as specified in claim 7, said means whereby said bars are laterally adjustable comprising a transverse guide on which the bars are slidable at one end, and a transverse guide for similarly supporting the bars at the other end, and means to fasten the bars in adjusted positions on said guides.

10. A structure as specified in claim 7, in combination with separate means above and below said frame to afford lateral adjustment of said cutting means, shoes to bear upon the materials serving to hold said bars down in place, transverse supports for the shoes, and means whereby said shoes are laterally adjustable along said transverse supports.

ALBERT G. WETMORE.